US011575269B1

(12) United States Patent
Stousland et al.

(10) Patent No.: US 11,575,269 B1
(45) Date of Patent: Feb. 7, 2023

(54) WATCH BAND CHANGING CRADLES FOR SMART WATCHES

(71) Applicant: Ocean3, Inc., Rye, NH (US)

(72) Inventors: Grant R. Stousland, Middleton, WI (US); Brett Zola, Rye, NH (US)

(73) Assignee: Surfs Up, LLC, Rye, NH (US)

( * ) Notice: Subject to any disclaimer, the term of this patent is extended or adjusted under 35 U.S.C. 154(b) by 0 days.

(21) Appl. No.: 17/341,588

(22) Filed: Jun. 8, 2021

Related U.S. Application Data

(60) Provisional application No. 63/035,888, filed on Jun. 8, 2020.

(51) Int. Cl.
*H02J 7/00* (2006.01)
*H02J 50/90* (2016.01)
*H02J 50/10* (2016.01)

(52) U.S. Cl.
CPC ............ *H02J 7/0042* (2013.01); *H02J 50/10* (2016.02); *H02J 50/90* (2016.02)

(58) Field of Classification Search
CPC .................................................. H02J 7/0042
See application file for complete search history.

(56) References Cited

U.S. PATENT DOCUMENTS

| | | | |
|---|---|---|---|
| 1,613,492 A | 1/1927 | Thompson | |
| 2,549,369 A | 4/1951 | Epstein | |
| 3,312,435 A | 4/1967 | Malone | |
| 4,034,849 A | 7/1977 | Zakrajsek | |
| 4,082,183 A | 4/1978 | Sturm | |
| 4,094,409 A | 6/1978 | Spranger et al. | |
| 4,216,858 A | 8/1980 | Beauchamp | |
| 4,293,943 A | 10/1981 | Avery et al. | |
| 4,830,181 A | 5/1989 | Hartman | |
| 5,383,552 A | 1/1995 | Dikowitz | |
| 6,341,751 B1 | 1/2002 | Herzog | |
| 10,043,357 B2 | 8/2018 | Hartweg et al. | |
| 10,264,857 B2 | 4/2019 | Perkins et al. | |
| 10,394,297 B1 | 8/2019 | Han | |
| 2015/0227114 A1 | 8/2015 | Perrinjaquet | |
| 2016/0211875 A1* | 7/2016 | Smith | H04M 1/04 |
| 2020/0343745 A1* | 10/2020 | Choi | H02J 7/0027 |

\* cited by examiner

*Primary Examiner* — Robert Grant
(74) *Attorney, Agent, or Firm* — Andrus Intellectual Property Law, LLP (57) ABSTRACT

A watch band changing cradle for a smart watch eliminates the need to use a finger nail to press release buttons on the backside surface of a smart watch when changing or swapping watch bands using slide-in band attachment fittings. The cradle is configured so that the smart watch nests and naturally aligns itself in the cradle so that release protrusions in the cradle can be used reliably to depress the release buttons on the backside of the smart watch. The cradle can be adapted to hold a disc-shaped induction charging pad which is magnetically attracted to the smart watch. The cradle can make the smart watch easier to stow when charging, and the magnetic attraction helps to align and hold the smart watch in the cradle.

15 Claims, 9 Drawing Sheets

WATCH BAND CHANGING CRADLES FOR SMART WATCHES

FIELD OF THE INVENTION

This invention is a tool for replacing or swapping watch bands, and in particular watch bands that use releasable, slide-in attachment fittings to connect the band to the housing of a smart watch. These slide-in attachment fittings are widely used on smart watches, such as the Apple Watch®.

BACKGROUND OF THE INVENTION

When using a slide-in attachment mechanism, the smart watch includes a first slide-in channel on one side of the watch housing and a second slide-in channel on the other side of the watch housing. One part of the watch band is connected to a first slide-in, band attachment fitting that is inserted and slid into the first slide-in channel. The other part of the band is connected to a second slide-in, band attachment fitting that is inserted and slid into the second slide-in channel. Each slide-in channel has an internal recess extending towards the backside of the smart watch housing. A spring biased locking mechanism on the band attachment fitting locks into the recess in the channel when the band attachment fitting is properly aligned within the channel.

The underside of the housing on the Apple® watch includes a circular sensor cap. It also includes two spring-biased release buttons. One of the release buttons is located near the first slide-in channel on one side of the watch and releases the locking mechanism on the band attachment fitting locked into the recess in the first slide-in channel. The other release button is located near a second slide-in channel on the other side of the smart watch, and releases the band locking mechanism on the attachment fitting locked into the second slide-in channel. To replace or swap the watch band, the smart watch owner or another person presses the release mechanism on the respective side of the watch, and slides the band attachment fitting from the slide-in channel. The new band is attached by sliding the band attachment fitting on the new band into the slide-in channel. U.S. Pat. No. 10,264,857 entitled "Attachment System for an Electronic Device," by Perkins et al., is assigned to APPLE, INC., describes the band attachment mechanism and is incorporated herein by reference.

The band attachment mechanism is designed to enable convenient swapping of watch bands. Owners of the Apple Watch® often have multiple watch bands for various dress, casual and sports activities. For example, different watch bands can be worn to match different outfits.

The release buttons are designed to be depressed with a fingernail. For some people, it is difficult to press the release button and simultaneously slide the watch band from the channel. It can be difficult for those with long or stick-on finger nails, or those with very short finger nails. Many do not want to use their finger nails to remove the band because it might break the finger nail. It can be especially difficult for the elderly or those that have compromised dexterity or eyesight to press the release button with a finger nail and contemporaneously slide the fitting from the channel. If one is having difficulty removing a band, the issue could be that grime or other impediments are in the channel, or that the release mechanism is not fully engaged, or perhaps that the release mechanism or the locking mechanism are broken. In these situations, it is difficult to determine the issue at hand, and it is annoying to have to keep pressing the release button with a fingernail even for those normally capable and willing to do so.

The primary object of the invention is provide a tool that is convenient to use and avoids the need to press the release buttons using a finger nail when changing or swapping watch bands using a slide-in, band attachment system.

SUMMARY OF THE INVENTION

The invention is a watch band changing cradle for a smart watch that is easy to use and eliminates the need to use a finger nail to press release buttons on the backside surface of a smart watch when changing or swapping watch bands using slide-in band attachment fittings. The cradle is configured so that the smart watch nests and naturally aligns itself in the cradle when it is placed in cradle so that release protrusions in the cradle can be used reliably to depress the release buttons on the backside of the smart watch. In some embodiments, the cradle is also adapted to hold a disc-shaped induction charging pad which is magnetically attracted to the smart watch. The cradle can make the smart watch easier to stow when charging in some circumstances. The magnetic attraction also helps to align and hold the smart watch in the cradle.

The cradle is especially made for a smart watch having a housing with a face on its top surface and a circular back cover sensor cap protruding slightly outward from its backside surface. The smart watch housing has first and second band-adjacent sidewalls on opposite sides of the face, and opposing first and second lateral sidewalls. A first slide-in channel for a band attachment fitting passes through the first band-adjacent sidewall, and a second slide-in channel for a band attachment fitting passes through the second band-adjacent sidewall. A first release button is located near the first slide-in channel on the backside of the smart watch and a second release button is located on the backside of the smart watch near the second slide-in channel. A button, e.g. a digital crown button or a home button, also extends outward from the first lateral sidewall of the smart watch.

The watch band changing cradle must be configured to fit specific models of smart watches because the dimensions of the housings are typically different. It is preferred that the cradle be made of molded rigid plastic, or some other rigid material. It is important that the smart watch housing nests within the cradle conveniently and accurately in order to properly align the release protrusions in the cradle with the release buttons on the backside of the smart watch. The cradle body has an upward facing watch support surface that receives and supports the backside surface of the smart watch housing. The watch support surface is preferably formed to be substantially complementary with the backside surface and lower sidewalls of the smart watch housing. Preferably, the sidewalls of the cradle body embodies a substantially rectangular outline with rounded corners. The cradle body has first and second band sides and first and second guide sides.

Guide walls extend up from the first and second guide sides of the cradle body. The inside facing surfaces of the guide walls are tapered outward to match the contour of the lower sidewalls of the smart watch. The height of the guide walls is chosen preferably to match the height of the maximum lateral width of the smart watch in order to maximize the height of the guide walls. This is desired because maximizing the height of the guide walls produces a snug fit in the cradle with a reliable feel and also facilitates accurate placement of the smart watch within the cradle. The watch support surface includes contoured transition regions between the bottom of the inside facing surfaces of the respective guide walls and remaining portions of the watch support surface. The watch support surface also includes a first contoured lip along the first band side of the cradle body and a second contoured lip along the second band side of the cradle body. The contoured lips and the contoured transition areas have a shape complementary to the backside and lower sidewalls of the smart watch, and help to center and hold the smart watch in the proper location in the cradle.

At least one of the guide walls but preferably both include a button recess to provide clearance for the button extending outward from the side of the smart watch, i.e. a digital crown button or home button. The current versions of the Apple Watch® have a symmetric shape on the backside from one band side to the other, and the release buttons are likewise located in symmetric locations across the watch backside from the first band side to the second band side. This symmetry enable the smart watch to be placed into the cradle in either direction, so long as each guide wall has a button recess to provide clearance for the button protruding from the side of the smart watch. If the backside of the watch is not symmetric, then only one guide wall should have the button recess to ensure proper alignment of smart watch in the cradle.

Importantly, a well or opening is provided in the watch support surface into which the circular back cover sensor cap on the smart watch is received when the smart watch is placed into the cradle. In one embodiment, the well or opening provides clearance for the sensor cap when the smart watch is placed in the cradle and the surrounding portion of the backside is supported by the watch support surface of the cradle. As discussed below, operation of the cradle to remove a slide-in band attachment fitting requires the user to press the cradle against the watch body. The well or opening provides clearance for the sensor cap so there is no unwanted pressure against the sensor cap when the cradle and the smart watch body are pressed together. In another embodiment, the well or opening is sized to receive a disc-shaped induction charging pad for the smart watch, and the backside surface of the smart watch is magnetically attracted to the charging pad in the well or opening. If a well is used in this embodiment, it should be dep enough to hold the disc-shaped induction charging pad and also provide slight clearance for the sensor cap so there is no significant pressure against the sensor cap when the cradle is pressed against the smart watch to depress the release buttons on the backside of the smart watch.

To depress the release buttons on the backside of the smart watch, the watch support surface includes a first release protrusion extending upwardly from the watch support surface near the first band side of the cradle body, and a second release protrusion extending upwardly from the watch support surface near the second band side of the cradle body. The release protrusions, as well as the other components of the cradle body, are preferably rigid. The preferred height of release protrusions above the watch support surface is 0.66 mm+/−0.10 mm. The footprint of the protrusions must fit within the footprint of the release buttons. More than one protrusion can be employed per side, however, it is important that the footprint of the one or more protrusions fit within the footprint of the respective release button on the backside of the smart watch. It is desired that the protrusion or the multiple protrusions provide a balanced pushing surface with respect to the center of the release button. When the smart watch is set into the cradle, the weight of the smart watch is not sufficient to press the release buttons on the backside of the smart watch inward, so the smart watch teeters slightly over the watch support surface. The preferred height of 0.66 mm+/−0.10 mm has been found sufficient to reliably depress the release buttons, without causing too much teetering before applying pressure, and no teetering after applying pressure.

The dimensions and shape of the watch support surface including the well or opening in the watch support surface, the first and second tapered guide walls, and the button recess in the respective first and/or second guide walls are such that the smart watch housing centers itself and nests within the cradle body with the release protrusions aligned with the release buttons on the backside of the smart watch housing, when the smart watch is placed in the cradle. Accordingly, with the smart watch centered and nested in the cradle, the user applies pressure by lightly pressing or holding the smart watch against the watch support surface of the cradle to cause the release protrusions in the cradle to depress the release buttons on the backside of the smart watch. The slide-in band attachment fittings for both sides of the watch band can be easily slid from the respective channel on the smart watch body as the user holds the cradle against the smart watch body. Normally, this process will be quite simple, and the slide-in band attachment fittings will slide out easily. However, in situations where the fitting is jammed from dirt or grime, the user will be able to generate more leverage and a better grip to slide out the fitting by holding the cradle against the smart watch body, instead of holding the smart watch while pressing the release button with a finger nail.

In embodiments in which the watch band changing cradle is adapted to hold a disc-shaped induction charging pad, it has been found to be important that the well or opening be sized with some clearance so that the that disc-shaped pad does not become stuck in the opening or well. On the other hand, it is not desirable for the pad to fit too loosely. If a well is used to hold the disc-shaped induction charging pad, instead of an opening through the cradle, it is desirable that the bottom of the well include a hole to enable one to push the disc-shaped induction charging pad from the well.

When the watch band changing cradle is adapted to hold a disc-shaped induction charging pad, it has been useful to provide a cord slot starting at the top of one of the guide walls and extending downward into the well or opening in which the disc-shaped induction charging pad is located. The slot accommodates the electrical supply cord that is connected to the disc-shaped induction charging pad, and, in particular, the protective elastomeric sleeve that covers the end of the cord as it is connected to the disc-shaped induction charging pad. It is preferred that the width of slot be slightly less than the diameter of the protective elastomeric sleeve when it is in a natural relaxed state. In this way, the slot helps to hold the charging pad in place in the well or opening without requiring that the fit in the well or opening be too tight for easy removal of the charging pad from the cradle.

As mentioned, the cradle body is desirably made of a rigid material such as rigid molded plastic. It may be desirable to place elastomeric padding on the downward facing surface of the cradle body to keep the cradle from sliding when it is set on a surface, especially when the cradle is adapted to hold a charging pad because the magnetic attraction holds the smart watch securely in the cradle. For example, elastomeric pads can be adhered near the corners of the downward facing surface. Alternatively, when the cradle is adapted to hold a charging pad, it may be desirable for some users to attach a pop socket to the downward facing surface of the cradle body so that the combination of the pop socket and the cradle can be used as a stand for the smart watch.

The cradle can also be adapted for other uses. For example, a link or chain can be attached to the cradle, preferably on one of the side walls, so that the cradle can also serve as a key chain.

DETAILED DESCRIPTION OF THE DRAWINGS

FIGS. 1 through 7 show a watch band changing cradle 100 constructed in accordance with a first embodiment of the invention. The watch band changing cradle 100 is used to engage a smart watch SW, FIGS. 6 and 7, with release protrusions in the cradle in order to reliably to depress the release buttons on the backside of the smart watch.

FIGS. 8 through 16 show a watch band changing cradle 100 constructed in accordance with a second embodiment of the invention, in which the cradle 200 is also adapted to hold a disc-shaped induction charging pad which is magnetically attracted to the smart watch.

Referring first to FIGS. 1 through 5, the watch band changing cradle 100 has a cradle body 102 with an upward facing watch support surface 104 for receiving the backside surface of the smart watch housing. A downward facing surface 106 (FIG. 3) sits flat on a horizontal surface. A first band side 108 is located on one side of the cradle body 102, and a second band side 110 is located on the opposite side of the cradle body 102. The cradle body 102 also includes a first guide wall side 112 and a second guide wall side 114 on the opposite side of the cradle body 102. The first and second guide wall sides 112, 114 are generally orthogonal to the first and second band sides 108, 110.

Figure 4:
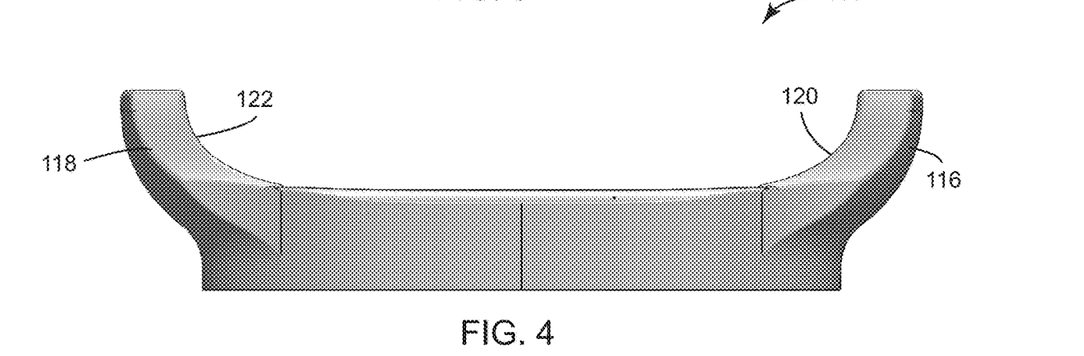
FIG. 4 is a side elevation view of the watch band changing cradle shown in FIG. 1, as viewed from one of the band sides of the cradle.

The cradle body 102 has a first guide wall 116 upstanding from the first guide wall side 112 of the body 102 and a second guide wall 118 upstanding from the second guide wall side 114 of the cradle body. Referring to FIG. 4, inside facing surfaces 120, 122 of the guide walls 116, 118 are tapered outward and curved to match the profile of the smart watch housing when the smart watch is set into the cradle 100. The watch support surface 104 includes contoured transition regions 124, 126 between the bottom of the inside facing surfaces 120, 122 of the respective guide walls 116, 118 and remaining portions of the watch support surface 104.

For smart watches that have a button on the sidewall of housing, sometimes called a bezel or crown, the cradle should be made with a button recess 126 in at least one of the first and second guide walls 116, 118. The button recess accommodates the button extending outward from the side of the smart watch when the smart watch is placed in the cradle. It may be desirable to place a button recess 126 in both the first and second guide walls 116, 118 to facilitate user convenience. On the other hand, if the cradle is made for a smart watch not having an extended button, or bezel or crown, then the recess is not necessary.

The watch support surface 104 includes a first contoured lip 128 on along the first band side 108 of the cradle body 102 and a second contoured lip 130 along the second band side 110 of the cradle body 102. A well 132 or opening is provided in the watch support surface 104 into which the circular back cover sensor cap of the smart watch is received, when the backside surface of the smart watch is placed into the cradle 100. The well 132 should be deep enough to provide clearance between the sensor cap and the bottom of the well 132 when the smart watch is placed in the cradle 100 and the user presses the cradle 100 and the watch together in order to depress the release buttons on the backside of the housing for the smart watch. The cradle 100 in FIGS. 1-7 shows a well 132 with a closed bottom. It is advantageous to have a closed bottom or nearly closed bottom because it makes it easier for the user to press the cradle 100 against the smart watch. On the other hand, having a circular opening instead of a well 132 is acceptable. Alternatively, providing a well with a small opening on the bottom is also possible.

The watch support surface 104 has a first release protrusion 134 extending upwardly from near the first band side 108 of the cradle body 102. A second release protrusion 136 extends upwardly from the watch support surface 104 near the second band side 110 of the cradle body. As mentioned above, for the Apple Watch®, the preferred height of release protrusions 134, 136 above the watch support surface 104 is 0.66 mm+/−0.10 mm. The footprint of the protrusions 134, 136 must fit within the footprint of the release buttons on the backside of the smart watch. More than one protrusion can be employed per side, however, it is important that the footprint of the one or more protrusions fit within the footprint of the respective release button on the backside of the smart watch. It is desired that each protrusion 134, 136

(or each group of protrusions) provide a balanced pushing surface with respect to the center of the respective release button. When the smart watch is set into the cradle 100, the weight of the smart watch is not sufficient to press the release buttons on the backside of the smart watch inward, so the smart watch teeters slightly over the watch support surface 104. The preferred height of 0.66 mm+/−0.10 mm has been found sufficient to reliably depress the release buttons, without causing too much teetering before applying pressure, and no teetering after applying pressure.

The dimensions and shape of the watch support surface 104 including the well 132 or opening in the watch support surface, the first and second tapered guide wall surfaces 120, 122 and the button recess 126 in the respective first or second guide walls (if needed) are such that the smart watch housing nests within the cradle body 102 and the first release protrusion 134 aligns with one of the first and second release buttons on the backside of the smart watch housing and the second release protrusion 136 aligns with the other of the first and second release buttons on the backside of the smart watch housing when the smart watch is placed in the cradle 102. At that point, the user applies pressure by pressing the smart watch against the cradle 102 to cause the first and second release protrusions 134, 136 to depress the release buttons on the backside of the smart watch, which consequently enables the user to remove the slide-in band attachment fittings in the respective first and second slide-in channels on the smart watch.

Figure 1:
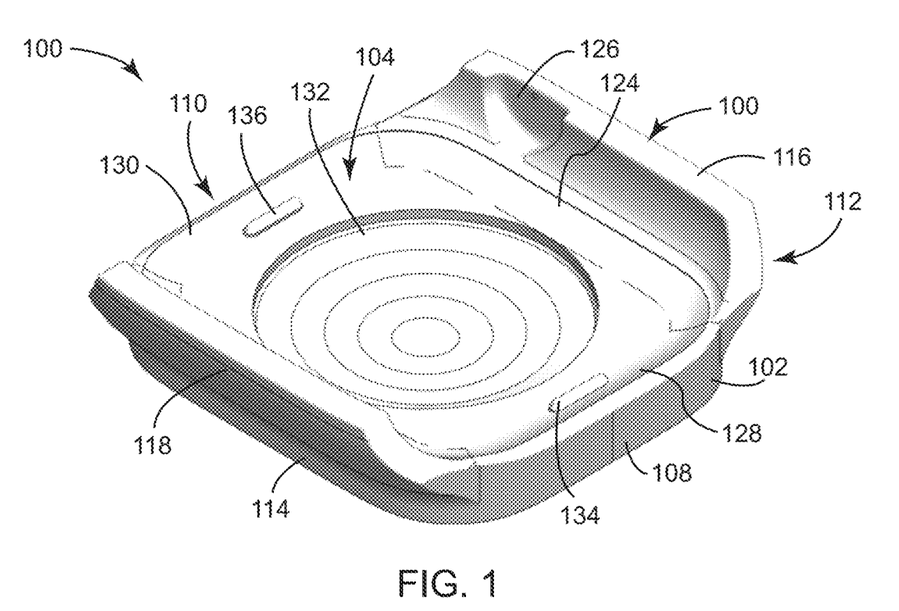
FIG. 1 is a perspective view of a watch band changing cradle constructed in accordance with a first embodiment of the invention.
Figure 2:
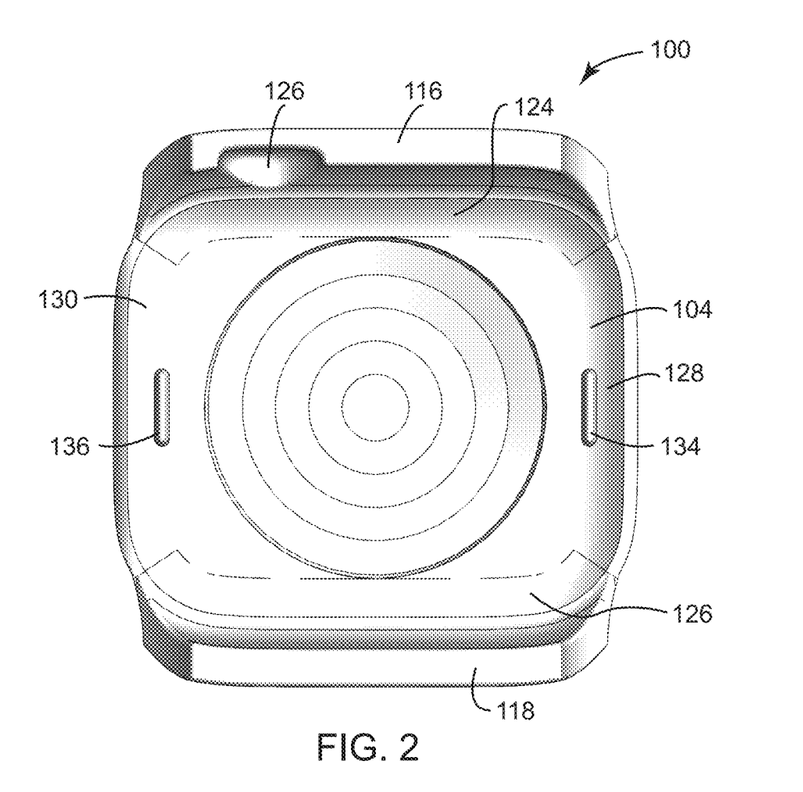
FIG. 2 is a top plan view of the watch band changing cradle shown in FIG. 1.
Figure 3:
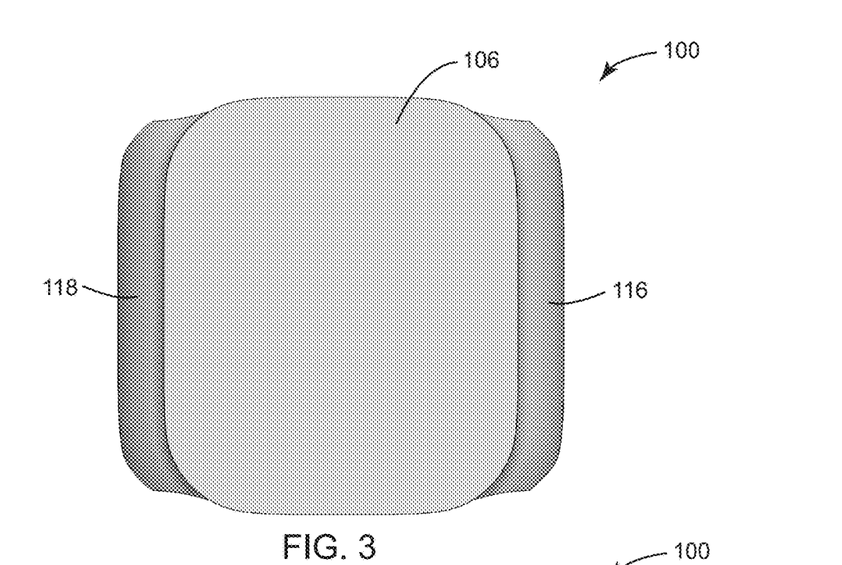
FIG. 3 is a bottom plan view of the watch band changing cradle shown in FIG. 1.
Figure 5:
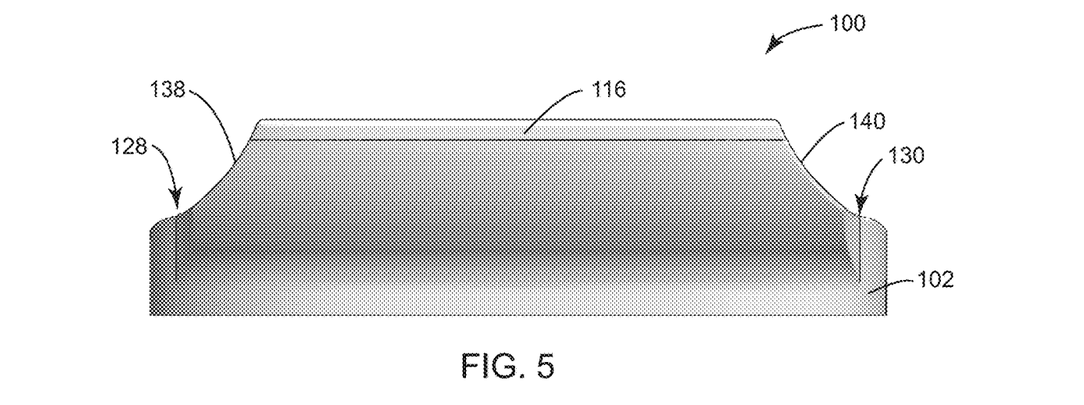
FIG. 5 is a side elevation view of the watch band changing cradle shown in FIG. 1, as viewed from a guide wall side of the cradle.
Figure 6:
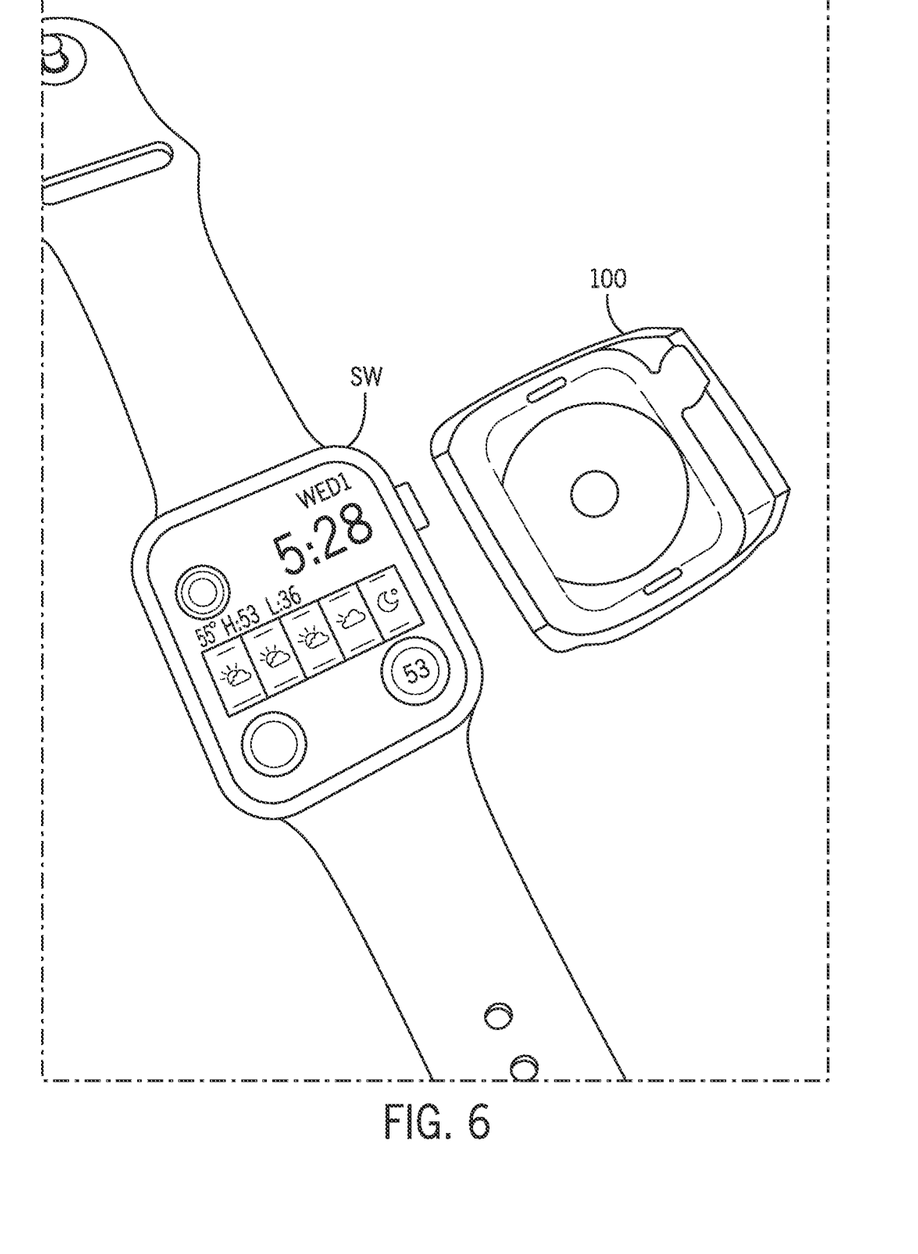
FIG. 6 is a photograph showing a smart watch on a table adjacent the watch band changing cradle shown in FIG. 1.
Figure 7:
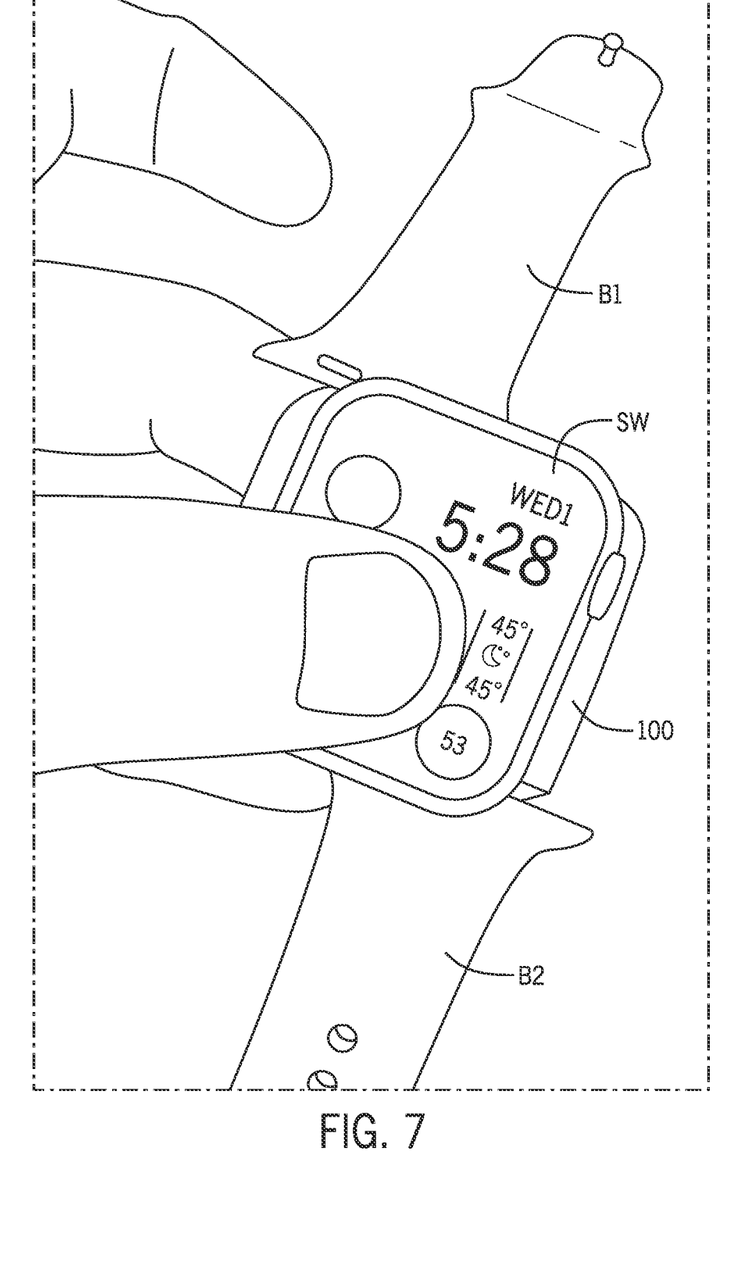
FIG. 7 is a photograph showing a user engaging the smart watch with the watch band changing cradle shown in FIG. 1 in order to remove the bands from the watch.
Figure 8:
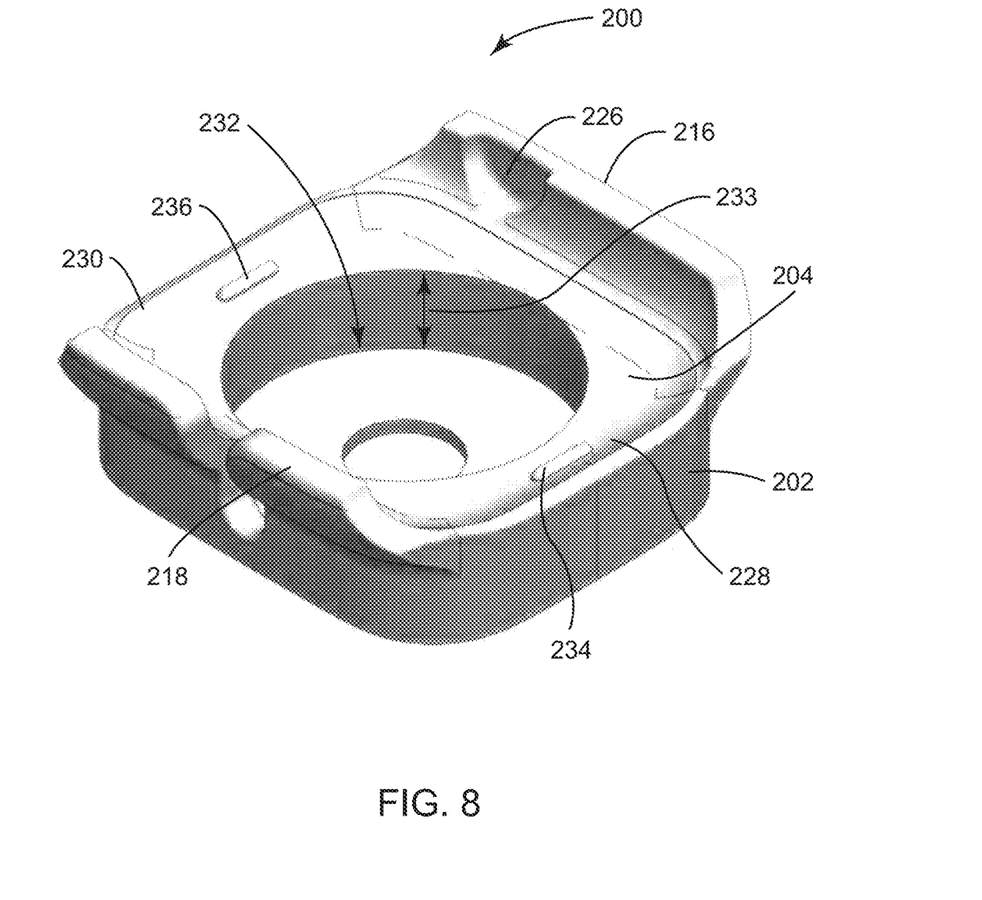
FIG. 8 is a perspective view of a watch band changing cradle constructed in accordance with a second embodiment of the invention.

FIG. 6 is a photograph showing a smart watch SW on a table adjacent the watch band changing cradle 100 shown in FIG. 1. FIG. 7 is a photograph showing a user engaging the smart watch SW with the watch band changing cradle 100 and removing the first band B1 and the second band B2 from the watch SW. Referring to FIG. 5, guide wall 116 has cutbacks 138 and 140 at its ends. These cutbacks 138, 140 are important so that the guide wall 112 does not cover the slide-in channel on the smart watch when the watch is placed in the cradle 100. It is preferred that the guide wall 118 on the opposite side have similar cutbacks. It is possible that the guide walls be made shorter as to not cover the slide-in channels, but it is beneficial to have as much guide wall as possible for the given model of smart watch SW. It is desirable that both sides of the slide-in channel remain uncovered so that the user can slide out the attachment fitting from either direction. It is also possible, however, to have only one side uncovered, although this is not preferred.

The release protrusions 134, 136 and the watch support surface 104 are made of a rigid material, such as a rigid molded plastic like ABS (Acrylonitrile butadiene styrene), which has been found to facilitate reliable depression of the release buttons on the backside of the smart watch SW with the design shown in the Figures. It is desirable that the nesting of the smart watch SW into the cradle 100 be tight enough so that the smart watch does not move appreciably side to side when it is placed in the cradle 100. The cradle 100 can be made of single material via molding, machining or 3D printing. On the other hand, it is possible to make the cradle from two or more materials that may for example snap together. For example, it is possible within the scope of the invention to mold the upper components with a rigid plastic material, and the bottom with another plastic. In this way, the bottom can be made of a material that is more elastic and can provide some level of friction when the cradle is set on a slippery surface. A two-part molded construction may be useful even if all components are made of a hard or rigid plastic. Although not shown in the drawings, one or more elastomeric pads can be placed on the bottom side surface 106 of the cradle body 102.

FIGS. 8 through 15 are directed to another embodiment of the invention in which the watch band changing cradle 200 is also configured to hold an induction charging disc CD for the smart watch SW. In many ways the configuration of the cradle 200 shown in FIGS. 8-15 is similar to that of cradle 100 shown in FIGS. 1-7. The primary difference is that the well 232 in cradle 200 is sized to receive a disc-shaped induction charging pad CD for the smart watch SW. The backside surface of the smart watch is magnetically attracted to the charging pad CD in the well 232, which results in a convenient charger holder and also helps to hold the smart watch in the cradle 200 when using it to change a watch band.

Similar to the cradle 100 in FIGS. 1-7, the watch band changing cradle 200 has a cradle body 202 with an upward facing watch support surface 204 for receiving the backside surface of the smart watch housing. A downward facing surface 206 (FIG. 3) sits flat on a horizontal surface. A first band side 208 is located on one side of the cradle body 202, and a second band side 210 is located on the opposite side of the cradle body 202. The cradle body 202 also includes a first guide wall side 212 and a second guide wall side 214 on the opposite side of the cradle body 102. The first and second guide wall sides 212, 214 are generally orthogonal to the first and second band sides 208, 210.

Figure 11:
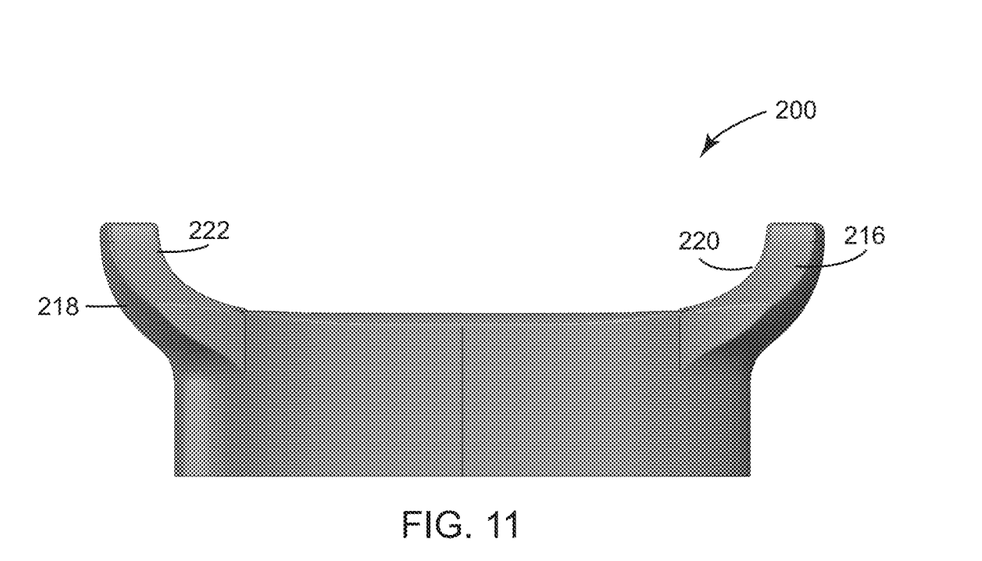
FIG. 11 is a side elevation view of the watch band changing cradle shown in FIG. 8, as viewed from one of the band sides of the cradle.

Also similar to the cradle 100 in FIGS. 1-7, the cradle body 202 has a first guide wall 216 upstanding from the first guide wall side 212 of the body 202 and a second guide wall 218 upstanding from the second guide wall side 214 of the cradle body 202. Referring to FIG. 11, inside facing surfaces 220, 222 of the guide walls 216, 218 are tapered outward and curved to match the profile of the smart watch housing when the smart watch is set into the cradle 200. The watch support surface 204 includes contoured transition regions 224, 226 between the bottom of the inside facing surfaces 220, 222 of the respective guide walls 216, 218 and remaining portions of the watch support surface 104.

For smart watches that have a button or bezel on the sidewall of housing, the cradle should be made with a button recess 226 in at least one of the first and second guide walls 216, 218.

The watch support surface 204 includes a first contoured lip 228 on along the first band side 208 of the cradle body 202 and a second contoured lip 230 along the second band side 210 of the cradle body 202. A well 232 or opening is provided in the watch support surface 204. The well 232 in the cradle 200 is configured to hold a circular disc induction charger CD, see e.g. FIG. 13. The well 232 should be cylindrical or nearly cylindrical to hold the charging disc loosely with a tight tolerance. It is most preferred that the charging disc CD be able to float slightly up and down in the well 232, but be held somewhat precisely side to side within the well 232. The height (arrow 233 in FIG. 8) of the well 232 needs to be able to accommodate the sensor cap and the charging disc, preferably with some clearance, while the watch support surface 204 and protrusions 234, 235 are pressed against the backside of the smart watch. The cradle 200 in FIGS. 8-15 shows a well 232 with bottom wall and an opening 207 in the bottom wall. This is desired in order to provide a relatively large area for the user to press the cradle 100 against the smart watch. On the other hand, the opening 207 provides a way for the user to push the charging disc CD from the well 232 in case it becomes jammed.

Figure 9:
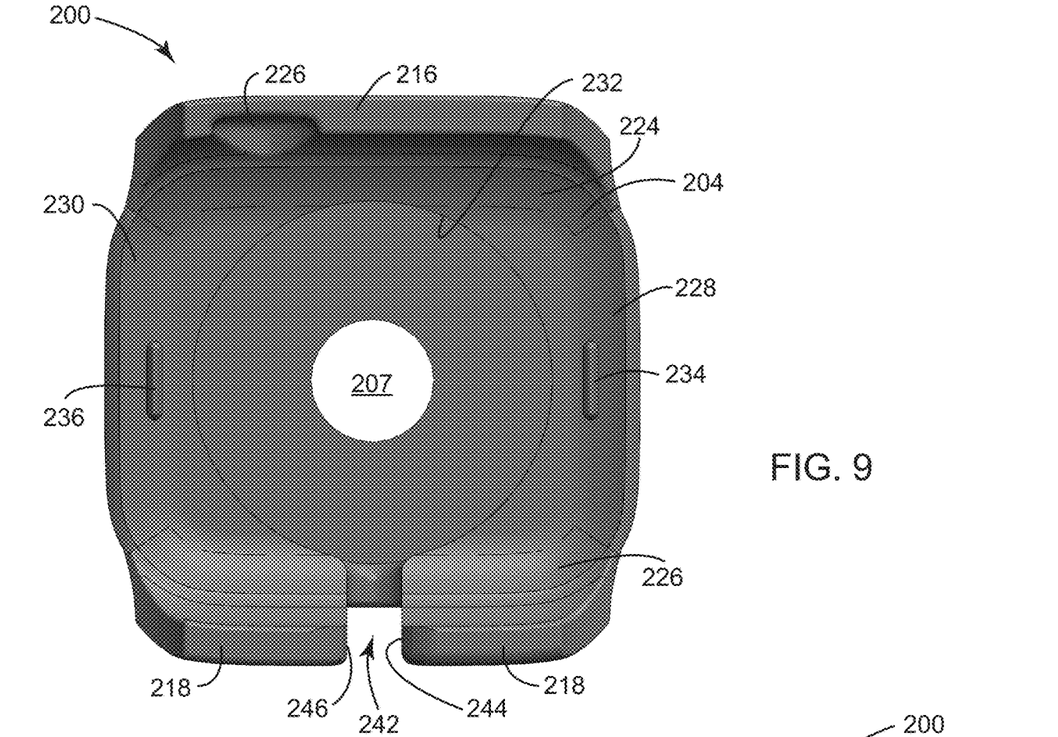
FIG. 9 is a top plan view of the watch band changing cradle shown in FIG. 8.
Figure 10:
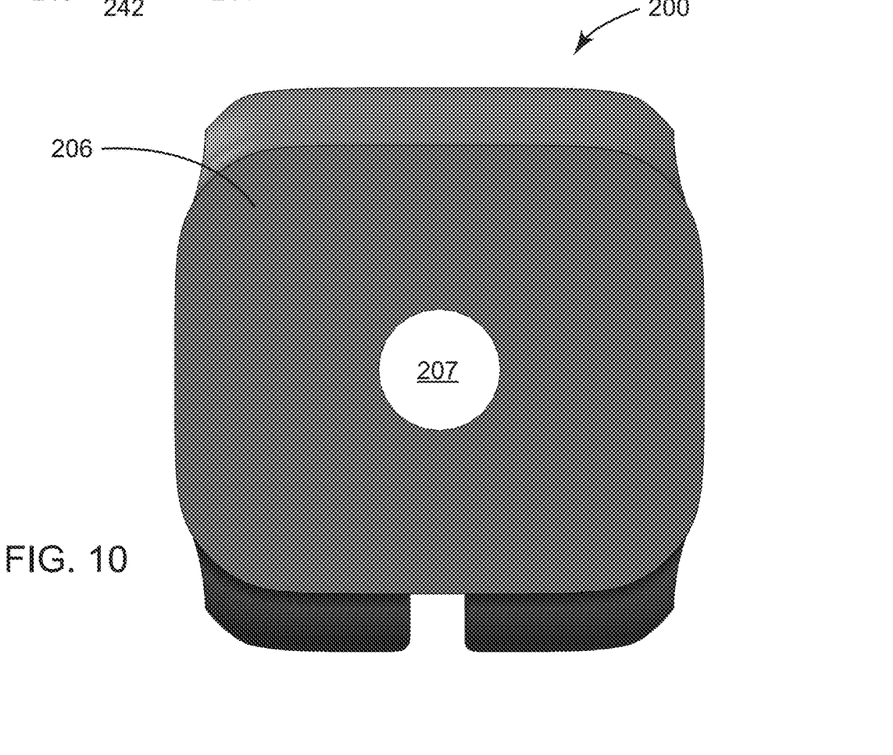
FIG. 10 is a bottom plan view of the watch band changing cradle shown in FIG. 8.

The guide wall 218 includes a slot 242, FIG. 9. The distance between the slot walls 244, 246 is selected to hold the elastomeric sleeve CS (FIG. 13) that is present on the commercially available induction chargers connecting the cord C to the circular disc CD. The walls 244, 246 at the top of the slot 242 are tapered to facilitate pushing the sleeve CS into the slot 242. The sleeve CS compressed as it is pushed into the slot when the charging disc CD is placed into the well 232. This compression has been found sufficient to reliably hold the charging disc CD in the cradle 200, even if the charging disc CD can otherwise float freely in the well 232.

Figure 12:
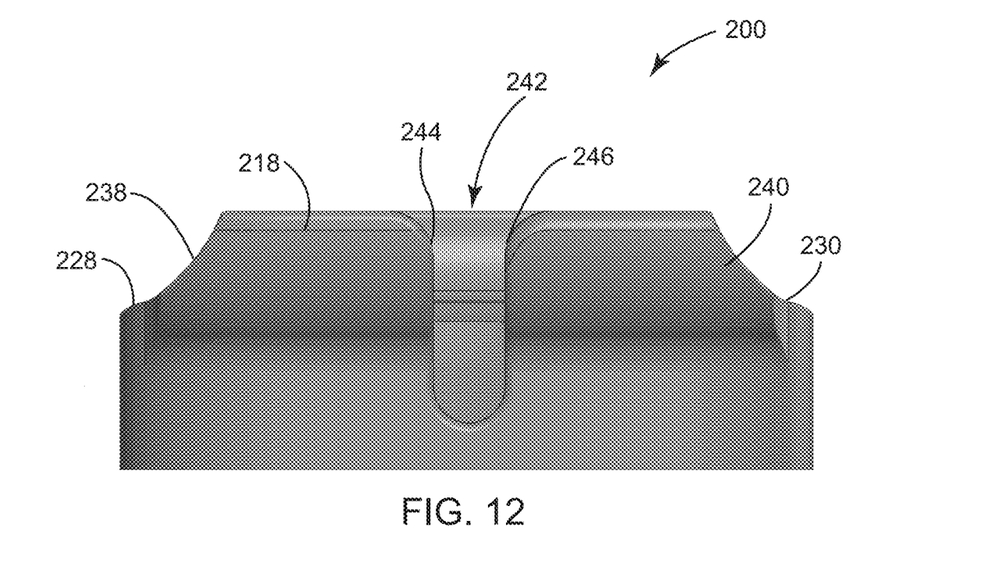
FIG. 12 is a side elevation view of the watch band changing cradle shown in FIG. 8, as viewed from a guide wall side of the cradle.

The watch support surface 204 in cradle 200 has a first release protrusion 234 and a second release protrusion 236 extending upwardly from the watch support surface 204 similar as with cradle 100. Again, the preferred height of release protrusions 134, 136 above the watch support surface 104 is 0.66 mm+/−0.10 mm. Other considerations described for the release protrusions in cradle 100 apply to the release protrusions in cradle 200. In addition, like cradle 100, the dimensions and shape of the watch support surface 204 including the well 232, the first and second tapered guide wall surfaces 220, 222 and the button recess 226 (if needed) are such that the smart watch housing nests within the cradle body 202 and the first release protrusion 234 aligns with one of the first and second release buttons on the backside of the smart watch housing and the second release protrusion 236 aligns with the other of the first and second release buttons on the backside of the smart watch housing when the smart watch is placed in the cradle 200. In this embodiment, if a charging disc CD is placed in the cradle 200, there will be magnetic attraction between the smart watch and the charging disc CD which will help to hold the smart watch At that point, the user applies pressure by pressing the smart watch against the cradle body 202 to cause the first and second release protrusions 234, 236 to depress the release buttons on the backside of the smart watch, which consequently enables the user to remove the slide-in band attachment fittings in the respective first and second slide-in channels on the smart watch. Referring to FIG. 12, guide wall 218 has cutbacks 238 and 240 at its ends. These cutbacks 238, 240 are important so that the guide wall 218 does not cover the slide-in channel on the smart watch when the watch is placed in the cradle 200. It is preferred that the guide wall 216 on the opposite side have similar cutbacks. It is possible that the guide walls be made shorter as to not cover the slide-in channels, but it is beneficial to have as much guide wall as possible for the given model of smart watch SW. It is desirable that both sides of the slide-in channel remain uncovered so that the user can slide out the attachment fitting from either direction. It is also possible, however, to have only one side uncovered, although this is not preferred.

Figure 13:
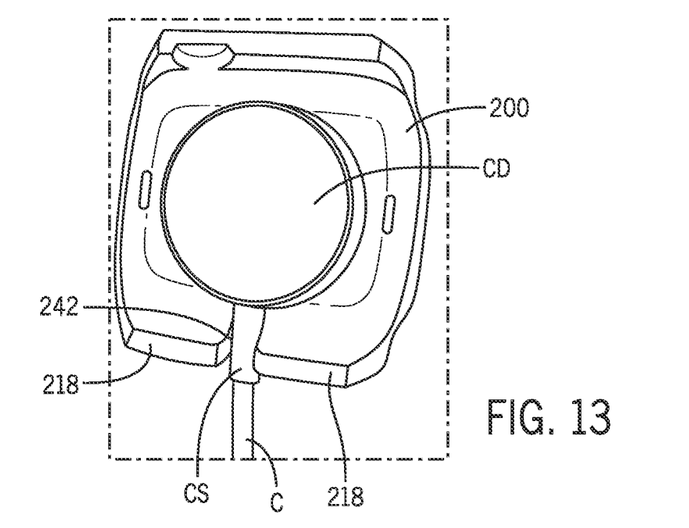
FIG. 13 is a photograph showing a smart watch charging disc being placed in the watch band changing cradle shown in FIG. 8.
Figure 14:
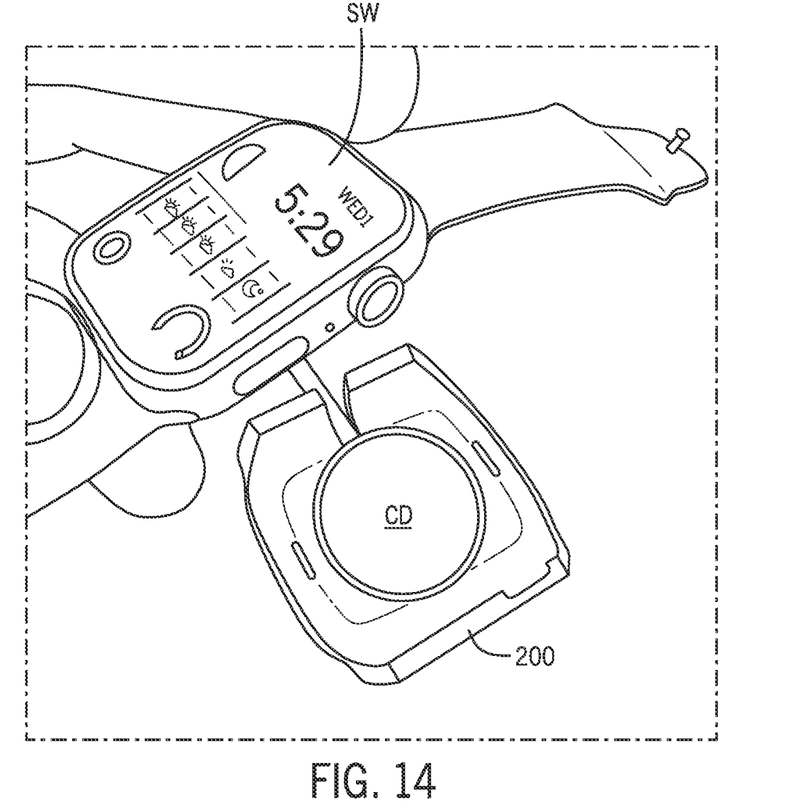
FIG. 14 is a photograph showing a user engaging the smart watch into the watch band changing cradle shown in FIG. 8, after the charging disc has been put into the cradle.
Figure 15:
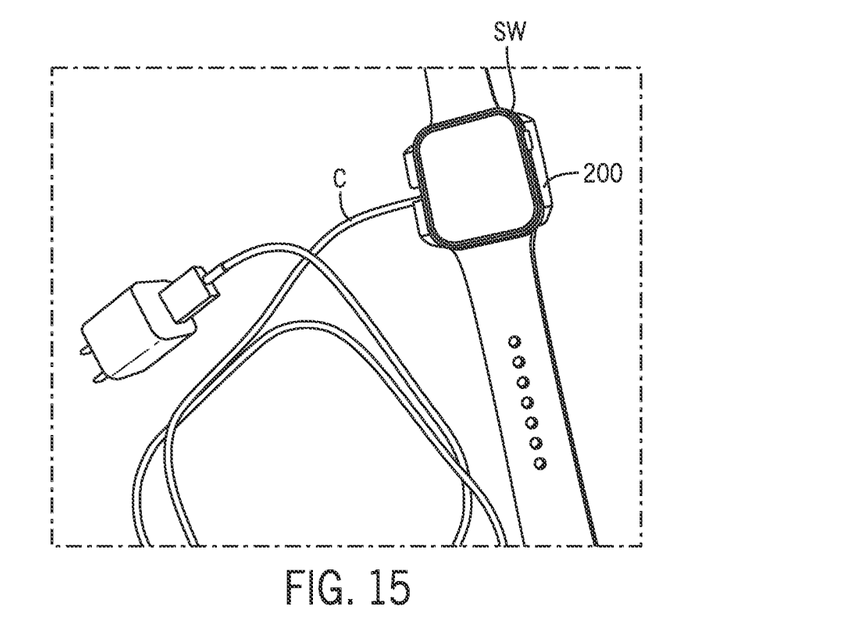
FIG. 15 is a photograph showing the smart watch loaded into the watch band changing cradle shown in FIG. 8 over the charging disc ready to be charged.
Figure 16:
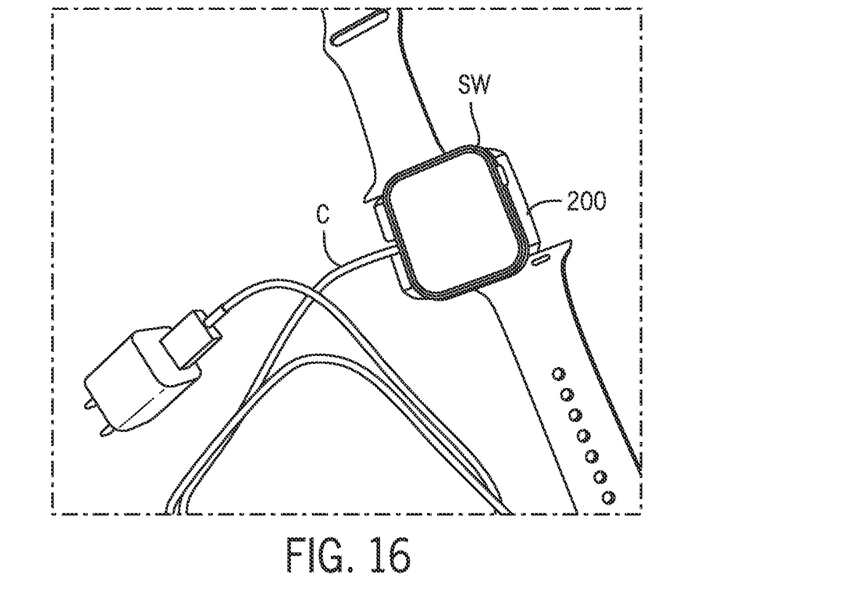
FIG. 16 is a photograph similar to FIG. 15, showing the bands being removed.

FIG. 13 is a photograph showing a smart watch charging disc CD being placed in the watch band changing cradle 200. The cord sleeve CS is placed in the slot 242 in the guide wall 218 to hold the charging disc CD in place. FIG. 14 is a photograph showing a user engaging the smart watch SW into the watch band changing cradle 200, after the charging disc CD has been put into the cradle 200. The user can place the smart watch SW into the cradle 200 without the charging disc CD if they choose to do so. FIG. 15 is a photograph showing the smart watch SW loaded into the watch band changing cradle 200 over the charging disc CD in a state where the smart watch SW is ready to be charged. FIG. 16 is a photograph similar to FIG. 15, showing the bands being removed. The smart watch SW must be pressed against the cradle 200 by the user to depress the release mechanisms in order to remove the slide-in band attachment fittings.

As discussed previously, the release protrusions 234, 236 and the watch support surface 1204 are made of a rigid material, such as a rigid molded plastic like ABS (Acrylonitrile butadiene styrene). Using rigid material has been found to facilitate reliable depression of the release buttons on the backside of the smart watch SW with the design shown in the Figures. It is desirable that the nesting of the smart watch SW into the cradle 200 be tight enough so that the smart watch does not move appreciably side to side when it is placed in the cradle 200. The cradle 100 can be made of single material via molding, machining or 3D printing. On the other hand, it is possible to make the cradle from two or more materials that may for example snap together. For example, it is possible within the scope of the invention to mold the upper components with a rigid plastic material, and the bottom with another plastic. In this way, the bottom can be made of a material that is more elastic and can provide some level of friction when the cradle is set on a slippery surface. This may be particularly desirably to provide a non-slip surface for cradle 200, which many users may find helpful when using the cradle to facilitate charging. A two-part molded construction may be useful even if all components are made of a hard or rigid plastic.

Although not shown in the drawings, one or more elastomeric pads can be placed on the bottom side surface 206 of the cradle body 202. In addition, the backside surface 206 can be configured to support the attachment of a pop socket to the cradle body 202. In this manner, the combination of the pop socket and the cradle 200 can be used as a stand for the smart watch SW.

We claim:

1. A watch band changing cradle for a smart watch, the smart watch comprising:
   a housing with a face surface on its top surface, a backside surface, opposing first and second band adjacent sidewalls, and opposing first and second lateral walls that are different than the first and second band adjacent sidewalls;
   a first slide-in channel for a band attachment fitting through the first band adjacent sidewall;
   a second slide-in channel for a band attachment fitting through the second band adjacent sidewall, wherein the first and second slide-in channels are on opposite sides of the face;
   said backside surface including a circular back cover sensor cap that protrudes outward from the backside surface of the smart watch and a first release button located near the first slide-in channel and a second release button located near the second slide-in channel; and
   a button extending outward from the first lateral sidewall of the smart watch;
   wherein said watch band changing cradle comprises:
   a cradle body with an upward facing watch support surface for receiving the backside surface of the smart watch housing, a downward facing surface that sits flat on a horizontal surface, a first band side on one side of the cradle body, a second band side on a side of the cradle body opposite the first band side, a first guide side on another side of the cradle body and a second guide side on a side of the cradle body opposite the first guide side; and
   the cradle body further comprises:
   a first guide wall upstanding from the first guide side of the of the body and a second guide wall upstanding from the second guide side of the cradle body, wherein inside facing surfaces of the guide walls are tapered outward and the watch support surface includes contoured transition regions between the bottom of the inside facing surfaces of the respective guide walls and remaining portions of the watch support surface;

a button recess in at least one of the first and second guide walls for the button extending outward from the side of the smart watch to reside when the smart watch is placed in the cradle;

a first contoured lip on the watch support surface along the first band side of the cradle body and a second contoured lip on the watch support surface along the second band side of the cradle body;

a well or opening in the watch support surface into which the circular back cover sensor cap is received when the backside surface of the smart watch is placed into the cradle;

a first release protrusion extending upwardly from the watch support surface near the first band side of the cradle body, and a second release protrusion extending upwardly from the watch support surface near the second band side of the cradle body; and wherein the dimensions and shape of the watch support surface including the well or opening in the watch support surface, the first and second tapered guide walls, and the button recess in the respective first or second guide walls are such that the smart watch housing nests within the cradle body and the first release protrusion aligns with one of the first and second release buttons on the backside of the smart watch housing and the second release protrusion aligns with the other of the first and second release buttons on the backside of the smart watch housing when the smart watch is placed in the cradle, and further wherein applying pressure by pressing the smart watch against the cradle causes the first and second release protrusions to depress the release buttons on the backside of the smart watch so that slide-in band attachment fittings in the respective first and second slide-in channels can be removed by sliding the respective band attachment fittings from the respective slide-in channels on the smart watch.

2. The watch band changing cradle for a smart watch recited in claim 1 wherein the well or opening in the watch support surface is circular.

3. The watch band changing cradle for a smart watch recited in claim 1 wherein the recited button recess is a first button recess and the first button recess is located in the first guide wall, and the cradle further comprises a second button recess located in the second guide wall.

4. The watch band changing cradle for a smart watch recited in claim 1 wherein the height of release protrusions above the watch support surface is 0.66 mm+/−0.10 mm.

5. The watch band changing cradle for a smart watch recited in claim 1 wherein the cradle including the release protrusions and the watch support surface are made of a rigid molded plastic.

6. The watch band changing cradle for a smart watch as recited in claim 1 further comprising one or more elastomeric pads on the downward facing surface of the cradle body.

7. The watch band changing cradle for a smart watch recited in claim 1 wherein the cradle body is generally rectangular with rounded corners between sides.

8. The watch band changing cradle for a smart watch as recited in claim 1 wherein the first and second guide walls extend along the first and second guide sides of the cradle body but provide clearance to remove band attachment fittings from the slide-in channels in the smart watch housing when the smart watch is placed in the cradle.

9. The watch band changing cradle for a smart watch as recited in claim 1 wherein the watch support surface and the release protrusion have symmetric shape and dimensions from one band side to the other band side.

10. The watch band changing cradle for a smart watch as recited in claim 1 further comprising a link on the side wall so that the changing cradle can also serve as a key chain.

11. The watch band changing cradle for a smart watch as recited in claim 1 wherein the well or opening is sized to receive a disc-shaped induction charging pad for the smart watch, and the backside surface of the smart watch is magnetically attracted to the charging pad in the well or opening.

12. The watch band changing cradle for a smart watch as recited in claim 11 wherein the well or opening is a well, and the bottom of the well includes a hole to enable on to push the disc-shaped induction charging pad from the well.

13. The watch band changing cradle for a smart watch as recited in claim 11 further comprising a cord slot starting the top of one of the first and second guide walls and extending downward into the well or opening for the disc-shaped induction charging pad.

14. The watch band changing cradle for a smart watch as recited in claim 13 wherein an electrical supply cord is connected to the disc-shaped induction charging pad and a protective elastomeric sleeve covers the end of the cord as it is connected to the disc-shaped induction charging pad, and the width of slot is slightly less than the diameter of the protective elastomeric sleeve when it is in a natural relaxed state.

15. The watch band changing cradle for a smart watch as recited in claim 11 wherein a pop socket is attached to the downward facing surface of the cradle body so that the combination of the pop socket and the cradle can be used as a stand for the smart watch.

* * * * *